United States Patent
Harada et al.

(10) Patent No.: US 7,428,841 B2
(45) Date of Patent: Sep. 30, 2008

(54) ACCELERATION SENSOR AND INCLINATION-DETECTING METHOD

(75) Inventors: Muneo Harada, Amagasaki (JP); Naoki Ikeuchi, Amagasaki (JP); Hiroyuki Hashimoto, Amagasaki (JP)

(73) Assignee: Tokyo Electron Limited, Tokyo (JP)

( * ) Notice: Subject to any disclaimer, the term of this patent is extended or adjusted under 35 U.S.C. 154(b) by 232 days.

(21) Appl. No.: 10/545,088

(22) PCT Filed: Feb. 10, 2004

(86) PCT No.: PCT/JP2004/001444

§ 371 (c)(1),
(2), (4) Date: Feb. 22, 2006

(87) PCT Pub. No.: WO2004/081584

PCT Pub. Date: Sep. 23, 2004

(65) Prior Publication Data

US 2006/0162450 A1  Jul. 27, 2006

(30) Foreign Application Priority Data

Feb. 10, 2003  (JP) .............................. 2003-033016

(51) Int. Cl.
*G01P 3/00* (2006.01)
*G01P 1/02* (2006.01)

(52) U.S. Cl. ..................... 73/509; 73/493; 73/514.01; 73/488

(58) Field of Classification Search ............... 73/509, 73/514.01, 514.02, 514.18, 514.21, 514.33
See application file for complete search history.

(56) References Cited

U.S. PATENT DOCUMENTS

| | | | | |
|---|---|---|---|---|
| 4,831,558 A | * | 5/1989 | Shoup et al. | 702/188 |
| 5,835,077 A | * | 11/1998 | Dao et al. | 345/157 |
| 5,866,818 A | * | 2/1999 | Sumi et al. | 73/514.33 |
| 6,112,594 A | * | 9/2000 | Brinks et al. | 73/493 |
| 6,115,261 A | * | 9/2000 | Platt et al. | 361/760 |
| 6,332,359 B1 | | 12/2001 | Ueyanagi et al. | |
| 6,634,113 B1 | * | 10/2003 | Almaraz et al. | 33/366.11 |
| 6,755,081 B2 | * | 6/2004 | Furukubo et al. | 73/493 |
| 2002/0109673 A1 | | 8/2002 | Valet | |

FOREIGN PATENT DOCUMENTS

| | | |
|---|---|---|
| EP | 0 401 635 A2 | 12/1990 |
| JP | 63-266359 | 11/1988 |
| JP | 03-105255 | 5/1991 |
| JP | 03-107767 | 5/1991 |
| JP | 06-151887 | 5/1994 |
| JP | 08-320341 | 12/1996 |
| JP | 11-183504 | 7/1999 |
| JP | 2000-206136 | 7/2000 |
| JP | 2001-099646 | 4/2001 |
| JP | 2001-311621 | 11/2001 |

* cited by examiner

*Primary Examiner*—Hezron E. Williams
*Assistant Examiner*—Gunnar J Gissel
(74) *Attorney, Agent, or Firm*—Finnegan, Henderson, Farabow, Garret & Dunner LLP

(57) ABSTRACT

In an acceleration sensor detecting inclined displacement of a predetermined article from a basic position, the acceleration sensor (10) includes a sensor chip having a detection plane including one detection axis or two crossing detection axes detecting the inclined displacement. An axis orthogonal to the detection plane of the sensor chip is disposed in parallel with a standard plane of the article in the basic position. Then, the sensor chip obtains an output signal according to the inclined displacement of the standard plane.

7 Claims, 11 Drawing Sheets

ACCELERATION SENSOR AND INCLINATION-DETECTING METHOD

TECHNICAL FIELD

The present invention relates to an acceleration sensor detecting inclined displacement of a predetermined article from its basic position.

BACKGROUND ART

Recently, acceleration sensors having a movable structural portion and utilizing gravity acceleration to detect inclined displacement of an apparatus or the like have been developed. Such an acceleration sensor generally utilizes piezoresistance effect of a semiconductor. For example, a cavity portion is formed within a silicon substrate to accommodate therein a block-shaped movable structural portion freely movable in three-dimensional directions. The movable structural portion is coupled to the silicon substrate with a beam which is a bridge structure, and is arranged such that stress corresponding to the movement of the movable structural portion is applied to a piezo element. Then, a change in the stress applied to the piezo element is detected as a change in resistance. Instead of the piezo element, a capacitive element provided in the movable structural portion can be used as an element for detecting the displacement.

DISCLOSURE OF THE INVENTION

In the acceleration sensor as described above, further improvement in detection accuracy is required.

Accordingly, an object of the present invention is to provide an acceleration sensor capable of detecting an inclination angle of an apparatus with high accuracy.

To achieve the foregoing object, an acceleration sensor in accordance with a first mode of the present invention is an acceleration sensor detecting inclined displacement of a predetermined article from a basic position, including a sensor chip having a detection plane including one detection axis or two crossing detection axes detecting the inclined displacement. An axis orthogonal to the detection plane of the sensor chip is disposed in parallel with a standard plane of the article in the basic position. Then, the sensor chip obtains an output signal according to the inclined displacement of the standard plane.

A method in accordance with a second mode of the present invention is a method of detecting inclined displacement of a predetermined article with respect to a basic position using a sensor chip having a detection plane including one detection axis or two crossing detection axes. The sensor chip is disposed such that an axis orthogonal to the detection plane is in parallel with a standard plane corresponding to the basic position of the article, and at the same time the detection axis is inclined at a predetermined angle with respect to the standard plane. Then, the inclined displacement of the article is detected based on displacement in the sensor chip in a direction of the detection axis.

Preferably, in each mode described above, the detection axis is inclined at a predetermined angle (45° or the like) with respect to the standard plane.

A mounting board in accordance with a third mode of the present invention is a rectangular mounting board on which a sensor chip for an acceleration sensor is mounted, and the sensor chip is mounted such that a detection axis of the sensor is inclined from vertical and from horizontal with respect to each edge of the board. Here, a sensor chip of a semiconductor piezoresistance type formed of a silicon substrate with a (110) plane is preferably employed.

BEST MODES FOR CARRYING OUT THE INVENTION

Figure 1A:
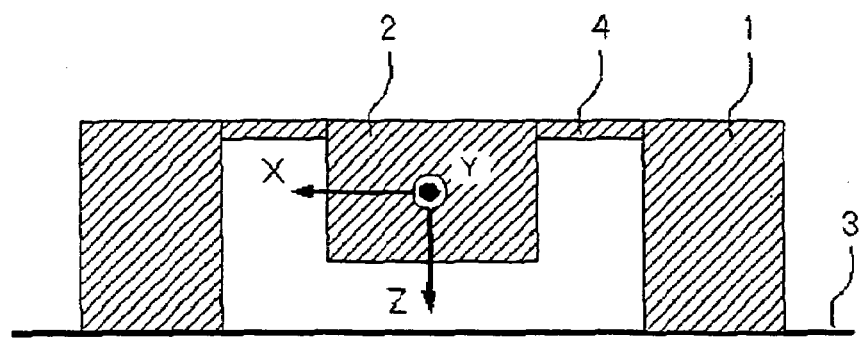
FIGS. 1A and 1B are explanatory views (cross-sectional views) illustrating a principle of an acceleration sensor applicable in the present invention.
Figure 1B:
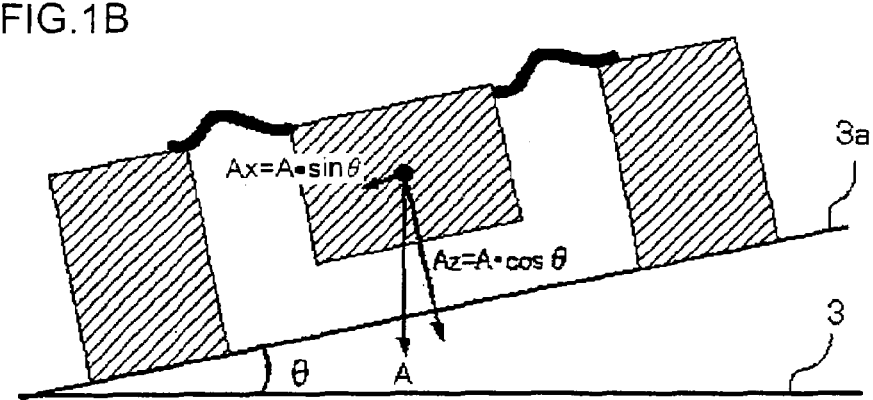

Firstly, a principle serving as a basis for the present invention will briefly be described. FIGS. 1A and 1B show a schematic structure of an acceleration sensor serving as a basis for the present invention. A cavity portion is formed within a silicon substrate 1 to accommodate therein a block-shaped movable structural portion 2 freely movable in three-dimensional directions. Movable structural portion 2 is coupled to silicon substrate 1 with a beam 4 which is a bridge structure, and is arranged such that stress corresponding to the movement of movable structural portion 2 is applied to a piezo element 4 provided on beam 4. Then, a change in the stress applied to piezo element 4 is detected as a change in resistance.

The acceleration sensor shown in FIGS. 1A and 1B is provided such that a chip surface (a detection plane) is horizontal a standard plane 3 of an apparatus in a basic position. In other words, an axis Y horizontal to the detection plane is provided as a rotation axis of standard plane 3, and outputs a vector component for each axis of weight acceleration caused by inclination of standard plane 3 (3a). FIGS. 1A and 1B show a three-axis acceleration sensor which is capable of detecting acceleration on X, Y and Z axes with a single chip, and it is structured such that the X and Y axes are disposed in a horizontal plane of the chip (the detection plane) and the Z axis is disposed vertically with respect to the chip. Assume that an inclination angle θ with respect to the horizontal is given to standard plane 3 of the apparatus as a result of rotation about the Y axis, the corresponding output of inclination angle θ provides $Ax=A·\sin\theta$ as an output on the X axis and $Az=A·\cos\theta$ as an output on the Z axis, as the vector components of gravity acceleration.

Since these outputs are those of trigonometric functions, in terms of inclination accuracy (resolution), it is desirable to use the output on the X axis, which is a sine function, at an angle close to 0° and use the output on the Z axis, which is a cosine function, at an angle close to ±90° in order to obtain maximum output change relative to the inclination angle. However, even if the axes are selected to obtain maximum output in this manner, the maximum output obtained is limited to a value determined by the sensitivity of the sensor, which has been insufficient for an application where a highly accurate output of the inclination angle is required. Further, detection at an angle close to 0° or ±90° described above is not necessarily desired in some applications, and there is an application where detection of any inclination angle, for example an angle close to ±45°, with high accuracy is desired.

Hereinafter, embodiments of the present invention will be described, taking an acceleration sensor detecting inclination displacement of an apparatus as an example.

Figure 2:
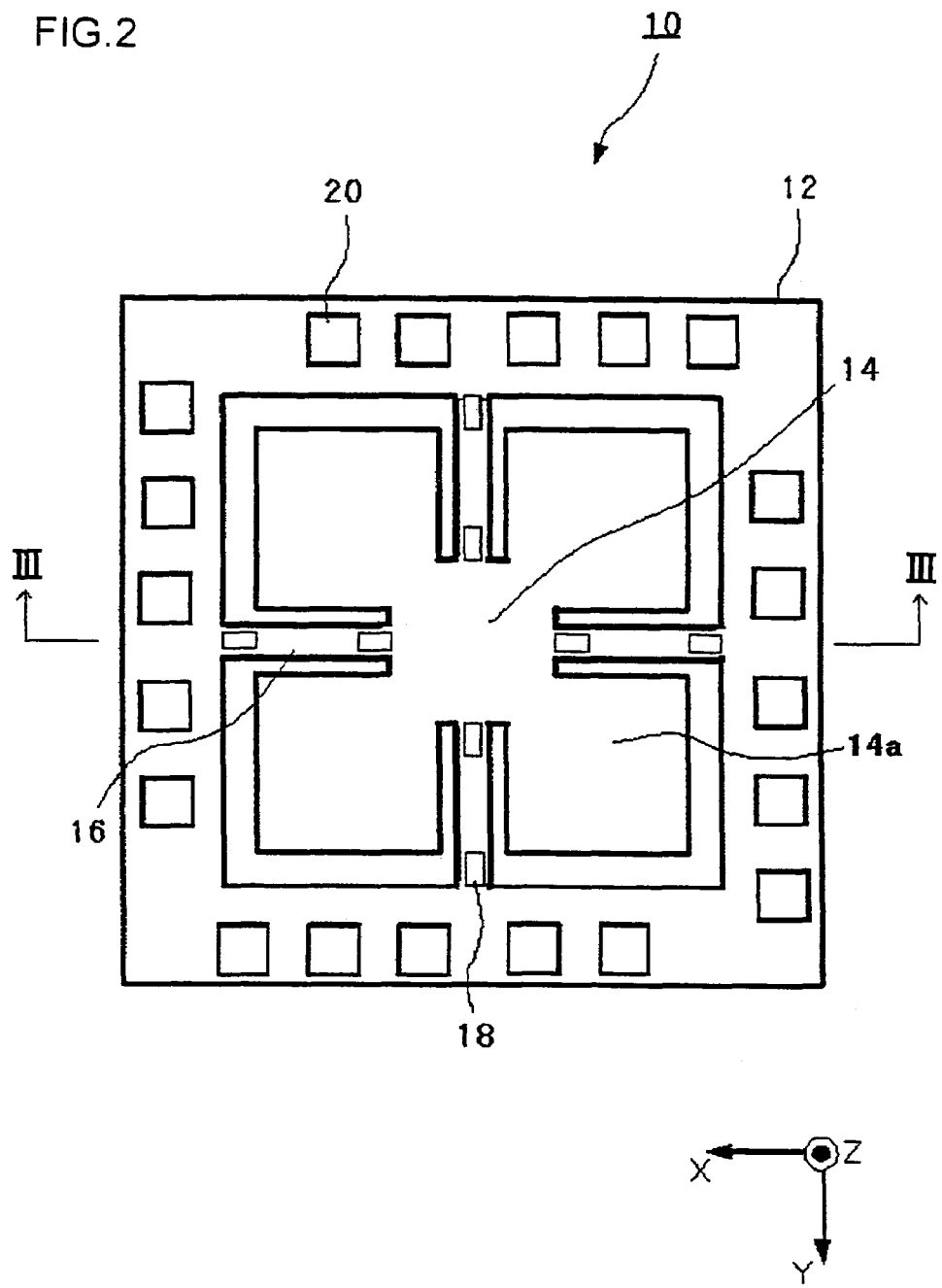
FIG. 2 is a plan view illustrating a structure of an acceleration sensor in accordance with a first embodiment of the present invention.
Figure 3:
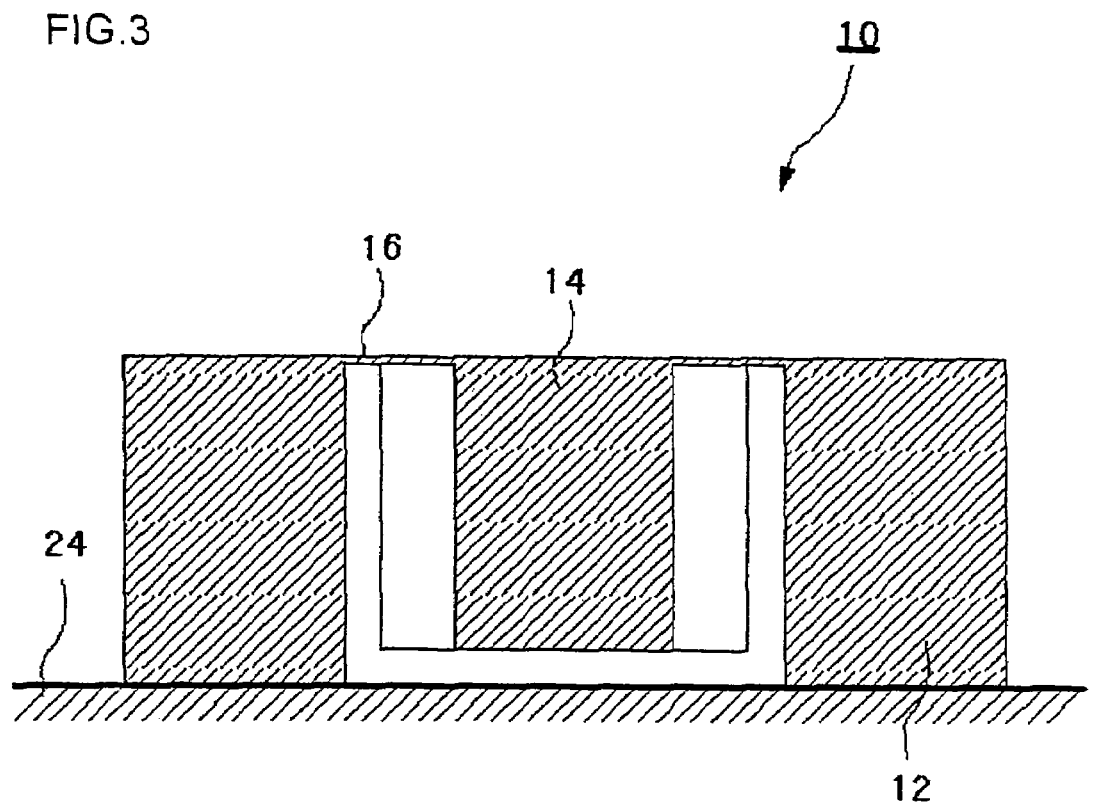
FIG. 3 is a cross-sectional view taken along a direction III-III in FIG. 2, illustrating an internal structure of the acceleration sensor in accordance with the first embodiment.

FIG. 2 is a plan view illustrating a structure of an acceleration sensor 10 in accordance with a first embodiment of the present invention. FIG. 3 is a cross-sectional view illustrating an internal structure of acceleration sensor 10. Acceleration sensor 10 in accordance with the present embodiment includes a silicon substrate 12 and a movable structural portion (a movable mass) 14 accommodated in silicon substrate 12 near its center to be movable in any direction from side to side or top to bottom. A box-shaped space is formed in the center of silicon substrate 12, in which movable structural portion 14 is formed. Movable structural portion 14 is shaped like a so-called clover, with four squares coupled in the center, to improve inertial force. Basically, the upper surface of movable structural portion 14 is designed to be flush with the upper surface of silicon substrate 12.

Sensor 10 is further provided with four beams (supporting bars) 16 connecting movable structural portion 14 and silicon substrate 12, and a piezoresistance element 18 disposed at a root of each beam 16. For the detection of an output on one axis, four piezoresistance elements 18 form a Wheatstone's bridge to output a voltage signal. Each beam 16 is disposed in movable structural portion 14 at a position corresponding to between leaves of the clover. An electrode pad 20 is formed on the upper surface of silicon substrate 12, and electrically connected with piezoresistance element 18 via an interconnection not shown. As shown in FIG. 3, silicon substrate 12 is fixed onto a die bond surface 24.

In manufacturing acceleration sensor 10 in accordance with the present embodiment, firstly an SOI substrate having an active layer (Si), a buried oxide film layer ($SiO_2$), and an Si substrate is formed. Thereafter, piezoresistance element 18, a metal interconnection, and electrode pad 20 are formed into an array to configure a bridge circuit on the active layer of the SOI substrate using a semiconductor processing technique, forming a sensor circuit. Next, beam portion 16 is formed by Si Deep RIE (Reactive Ion Etching).

Thereafter, Si Deep RIE is also conducted from the side of the Si substrate to form movable structural portion 14, and the buried oxide film is etched to release movable structural portion 14. Next, dicing is performed to cut the SOI substrate into sensor chips, forming individual sensor chips.

Figure 4:
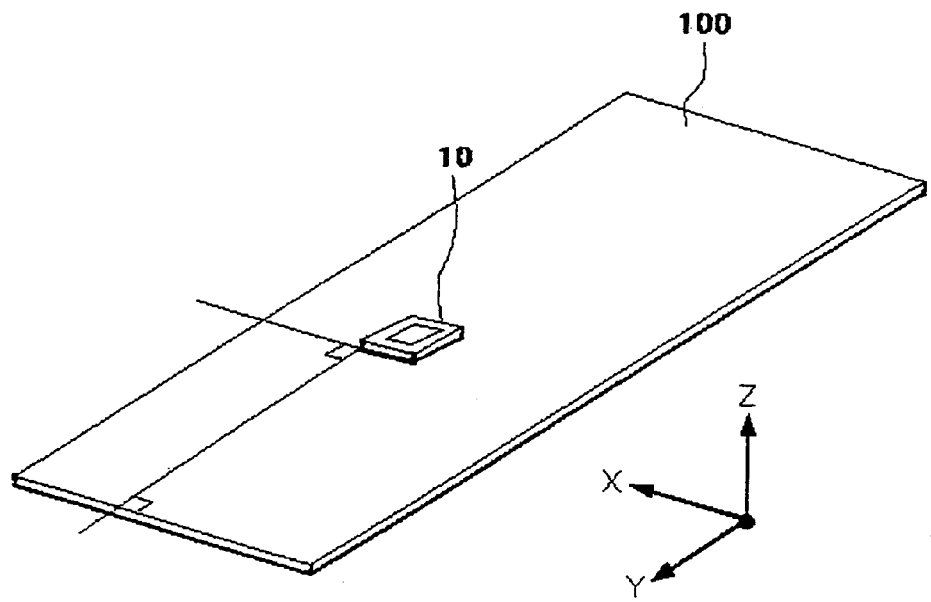
FIG. 4 is a schematic perspective view illustrating a mounting board having the acceleration sensor in accordance with the first embodiment.
Figure 5:
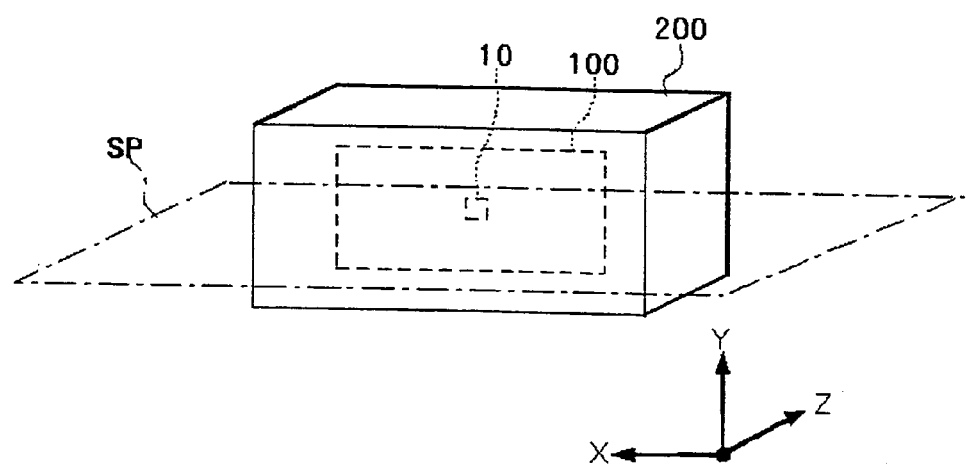
FIG. 5 is an explanatory view (a perspective view) illustrating a state in which the mounting board shown in FIG. 4 is installed in an apparatus.

Acceleration sensor 10 manufactured as described above is mounted for example on a rectangular mounting board 100 as shown in FIG. 4. As shown in FIG. 5, mounting board 100 is used to stand vertical to an apparatus 200 such as a projector, a head mounted display, a portable game apparatus, or a game controller. Sensor chip 10 is mounted on mounting board 100 such that each of two orthogonal detection axes is horizontal to each edge of mounting board 100.

Figure 6:
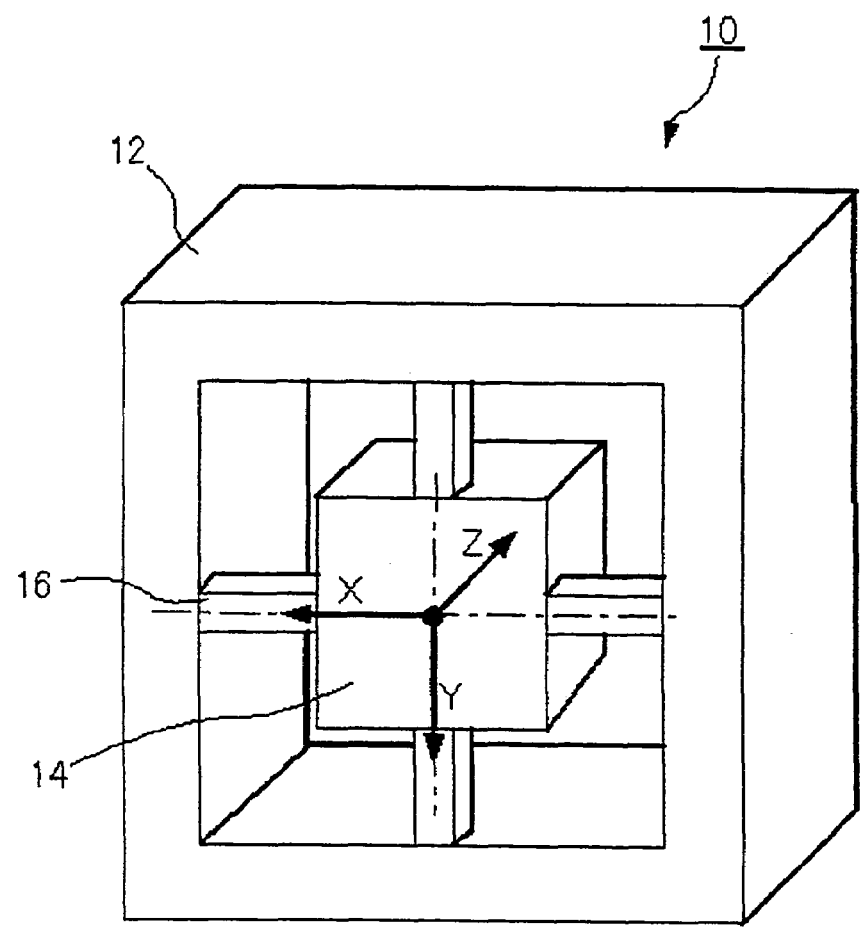
FIG. 6 is an explanatory view illustrating an actual state (orientation, arrangement) of using the acceleration sensor in accordance with the first embodiment, showing a positional relation with a standard plane of the apparatus in which the acceleration sensor is installed.
Figure 6:
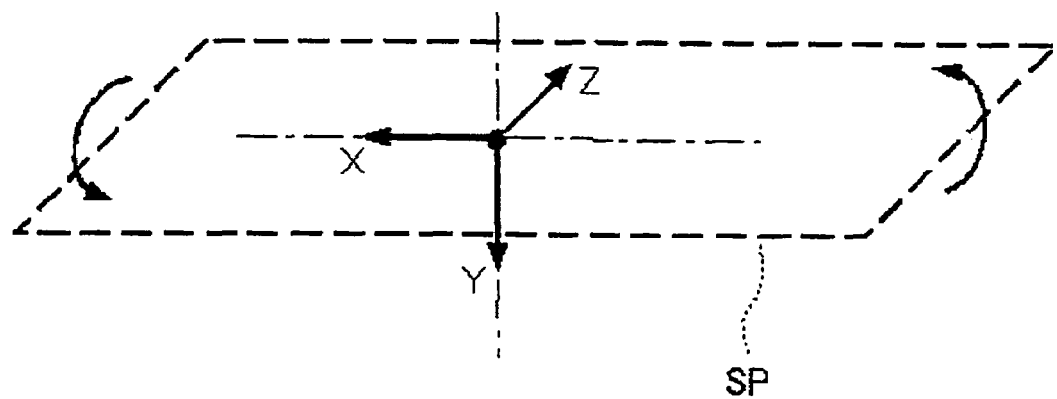

FIG. 6 schematically illustrates an arrangement (orientation) when acceleration sensor 10 is installed in the apparatus. In the drawing, SP indicates a standard plane when the apparatus equipped with sensor 10 is in a basic position. For example, in a projector, standard plane SP coincides with a horizontal plane of the projector when it is in a desirable status of use (basic position). When the apparatus is in the basic position, a detection plane (14) of sensor 10 stands vertical. Specifically, a detection axis Z orthogonal to detection axes X and Y in the detection plane (14) is disposed in parallel with standard plane SP of the apparatus in the basic position.

In the present invention, a "detection axis" refers to a direction in which displacement is detected, and it does not necessarily mean a physical axis. Specifically, when a piezoresistance element is used as in the present embodiment, the direction of the beam in which the element is disposed may coincide with the detection axis. However, when a capacitive element is disposed in the movable structural portion and displacement of the movable structural portion is measured by the capacitive element, the direction of the beam may not coincide with the detection axis.

In the present embodiment, inclined displacement of standard surface SP is determined based on a difference between or a sum of an output signal on the detection axis X and an output signal on the detection axis Y, and the inclined displacement is corrected if necessary.

Figure 7:
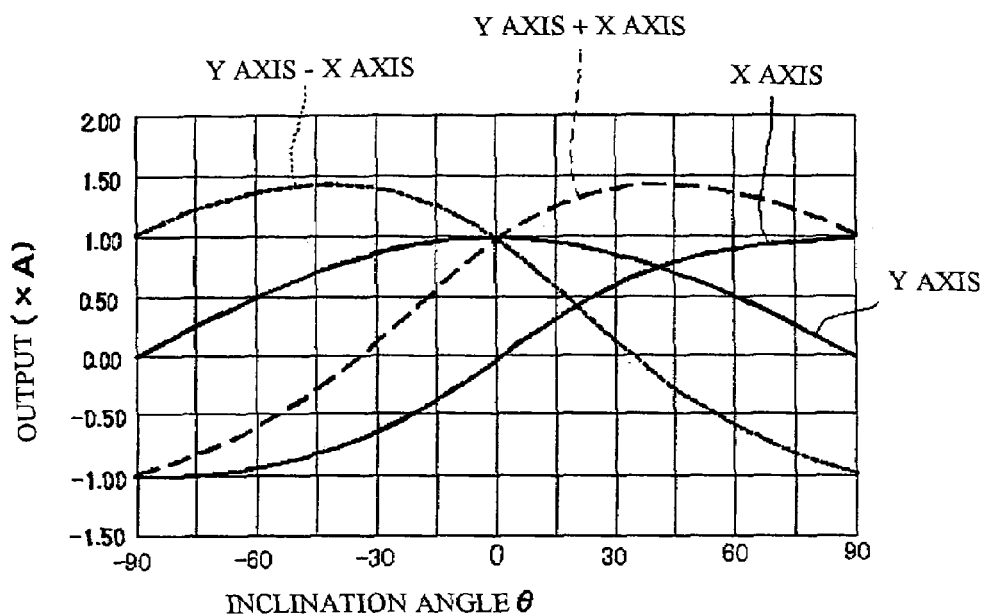
FIG. 7 is a graph illustrating outputs of the acceleration sensor in accordance with the first embodiment relative to an inclination angle of the apparatus (the standard plane).
Figure 8:
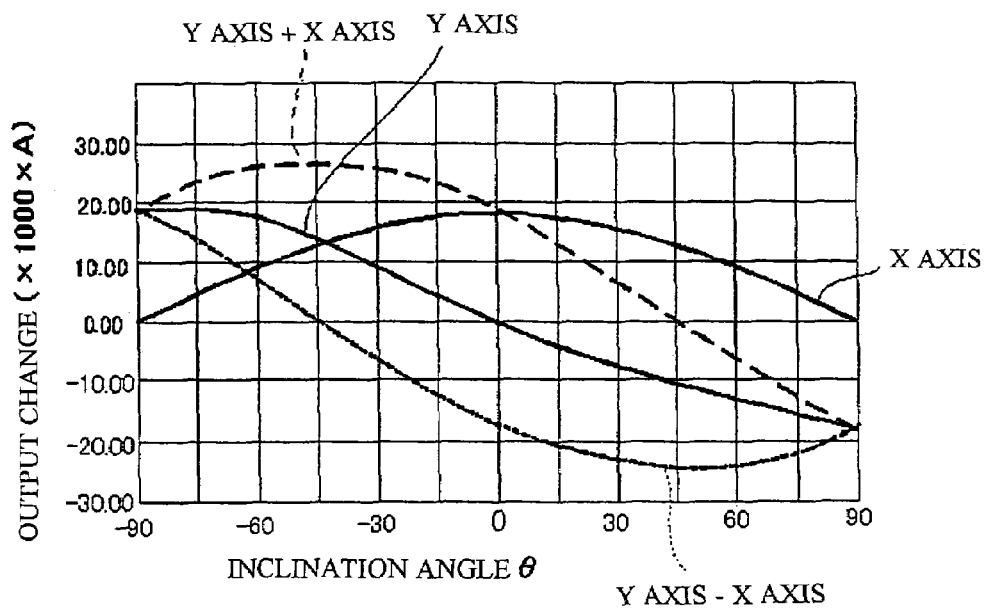
FIG. 8 is a graph illustrating changes in the outputs of the acceleration sensor in accordance with the first embodiment relative to the inclination angle of the apparatus (the standard plane).

FIG. 7 shows an output on the X axis, an output on the Y axis, the output on the Y axis−the output on the X axis, and the output on the Y axis+the output on the X axis with respect to inclination angle θ on this occasion, and FIG. 8 shows changes in the outputs per 1° (an output equivalent to gravity acceleration is indicated as A). As can be seen from FIG. 8, an absolute value of the change in the output on the Y axis−the output on the X axis at an angle close to+45° and an absolute value of the change in the output on the Y axis+the output on the X axis at an angle close to−45° are greater than absolute values of the changes in the outputs on the X axis and the Y axis. Specifically, while the absolute value of the change in the output on the X axis or the Y axis is $12.23\times10^{-3}$ A/°, the absolute value of the change in the output on the Y axis−the output on the X axis or the output on the Y axis+the output on the X axis is 24.68×10⁻³ A/°, which is about twice greater than the former value.

As described above, an inclination angle for example close to ±45° can be detected with high accuracy by obtaining the sum of or the difference between the outputs on the X axis and the Y axis. In particular, since the technique to obtain the difference between the outputs on the two axes, such as the output on the Y axis−the output on the X axis, can be expected to cancel a noise component or a thermal characteristic component of the output on each axis, inclination accuracy is improved and a desirable effect can be obtained.

Figure 9:
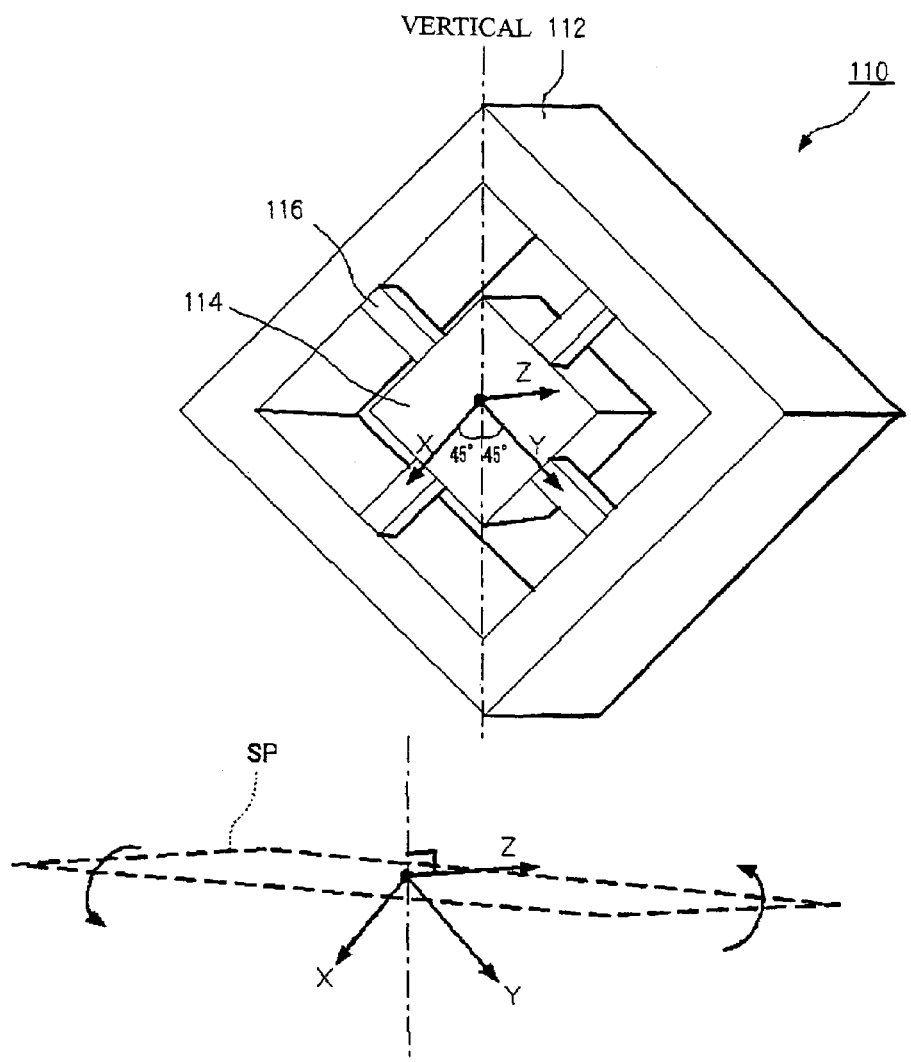
FIG. 9 is an explanatory view illustrating an actual state (orientation, arrangement) of using an acceleration sensor in accordance with a second embodiment of the present invention, showing a positional relation with a standard plane of an apparatus in which the acceleration sensor is installed.

FIG. 9 schematically illustrates an arrangement (orientation) when an acceleration sensor 110 in accordance with a second embodiment of the present invention is installed in an apparatus. The basic structure of sensor 110 in the present embodiment is the same as that of sensor 10 in the first embodiment described above, except for a relative positional relation with the mounting board and the apparatus to be installed. In the drawing, SP indicates a standard plane when the apparatus equipped with sensor 110 is in a basic position, and numerals 112, 114, and 116 correspond to silicon substrate 12, movable structural portion 14, and beam 16 in the first embodiment, respectively. When the apparatus is in the basic position, a detection plane (114) of sensor 110 stands vertical. Specifically, the detection axis Z orthogonal to the detection axes X and Y in the detection plane (114) is disposed in parallel with standard plane SP of the apparatus in the basic position. Then, inclined displacement of standard surface SP is determined based on a difference between or a sum of an output signal on the detection axis and an output signal on the detection axis Y, and the inclined displacement is corrected if necessary.

In the present embodiment, the detection axes X and Y orthogonal to each other are each disposed to form an angle of 45° with respect to standard plane SP. It is to be noted that the angle between the detection axis X or Y and standard plane SP is not limited to 45°, and can be changed as appropriate.

Figure 10:
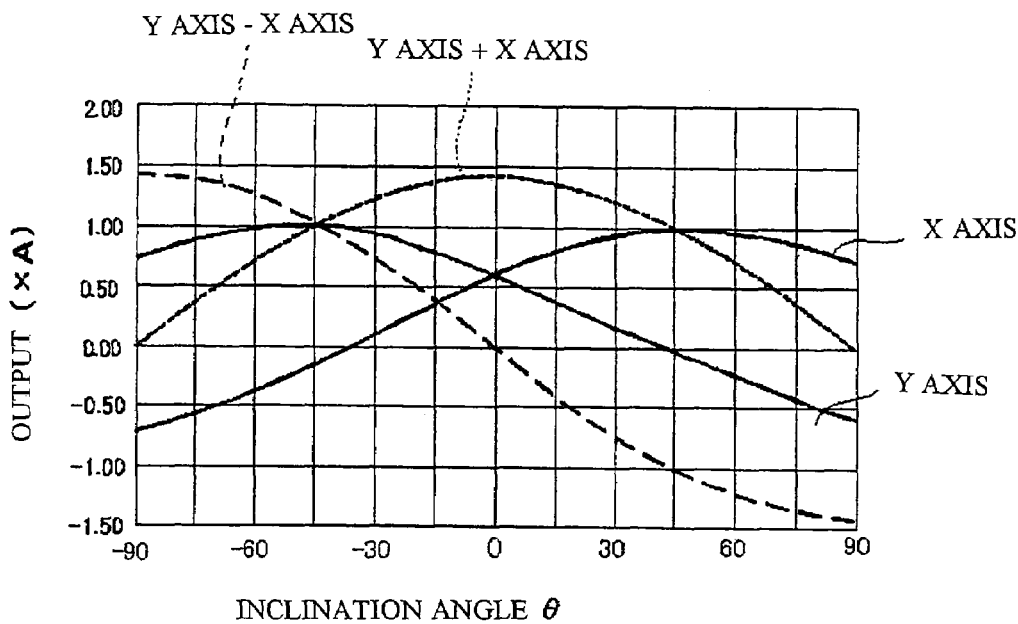
FIG. 10 is a graph illustrating outputs of the acceleration sensor in accordance with the second embodiment relative to an inclination angle of the apparatus (the standard plane).
Figure 11:
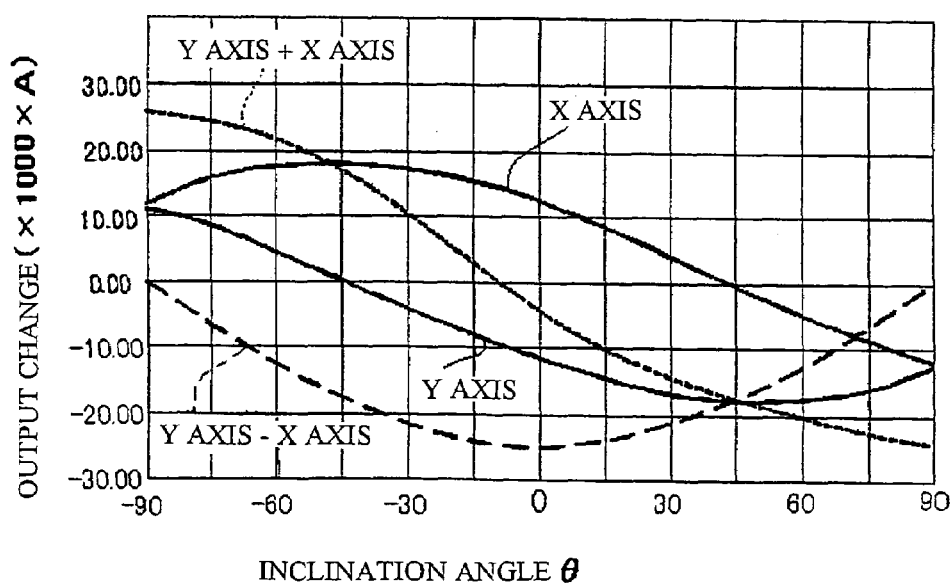
FIG. 11 is a graph illustrating changes in the outputs of the acceleration sensor in accordance with the second embodiment relative to the inclination angle of the apparatus (the standard plane).

FIG. 10 shows an output on the X axis, an output on the Y axis, the output on the Y axis−the output on the X axis, and the output on the Y axis+the output on the X axis with respect to inclination angle θ. FIG. 11 shows changes in the outputs per 1° when an output equivalent to gravity acceleration is indicated as A. As can be seen from FIG. 10, the change in the output on the X axis or the Y axis at an angle close to ±45° is increased by disposing the sensor to be inclined at 45°. As a result, accuracy in detecting inclination can be improved. While the absolute value of the output on the X axis or the Y axis is 12.23×10⁻³ A/° in the first embodiment, an absolute value of the output on the X axis or the Y axis is 17.60×10⁻³ A/° in the present embodiment, which is about 1.44 times greater than the former value.

Further, as can be seen from FIG. 11, as for the change in the output at an angle close to 0°, the output on the Y axis−the output on the X axis has the greatest value, which is 24.68×10⁻³ A/° in an absolute value, about twice greater than an absolute value of 12.45×10⁻³ A/° of the X axis or the Y axis. Furthermore, as for the change in the output at an angle close to ±90°, the output on the Y axis+the output on the X axis has the greatest value, which is 24.68×10⁻³ A/° in an absolute value, about twice greater than an absolute value of 12.23×10⁻³ A/° of the X axis or the Y axis.

As described above, an inclination angle for example close to 0°, ±90° can be detected with high accuracy by obtaining the sum of or the difference between the outputs on the X axis and the Y axis. In particular, since the technique to obtain the difference between the outputs on the two axes, such as the output on the Y axis−the output on the X axis, can be expected to cancel a noise component or a thermal characteristic component of the output on each axis, inclination accuracy is improved and a desirable effect can be obtained.

Figure 12:
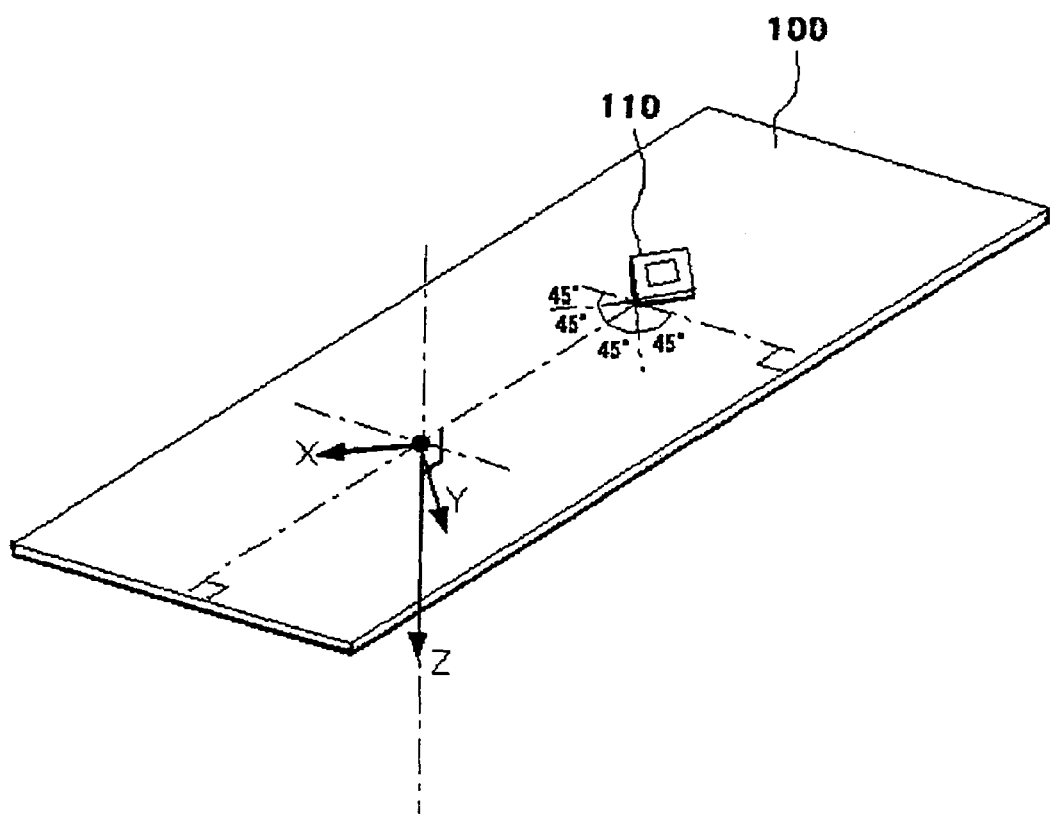
FIG. 12 is a schematic perspective view illustrating a mounting board having the acceleration sensor in accordance with the second embodiment.
Figure 13:
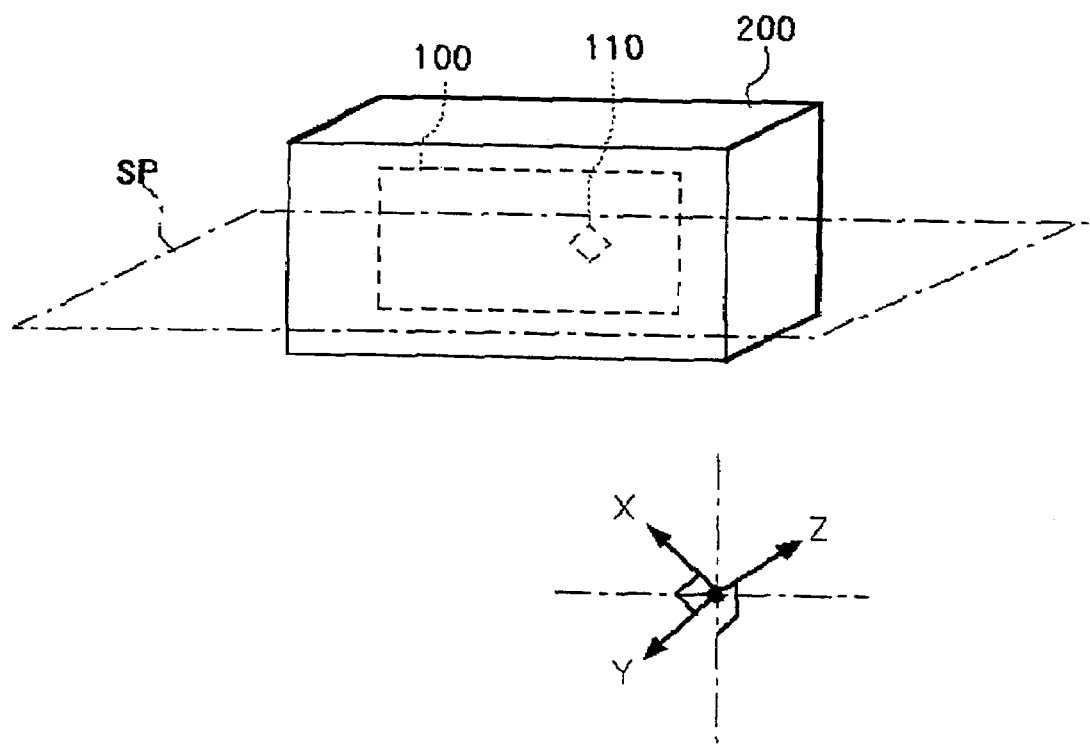
FIG. 13 is an explanatory view (a perspective view) illustrating a state in which the mounting board shown in FIG. 12 is installed in the apparatus.

Acceleration sensor 110 in accordance with the present embodiment is mounted on mounting board 100 as shown in FIG. 12. Then, as shown in FIG. 13, mounting board 100 is used to stand vertical to apparatus 200 such as a projector, a head mounted display, a portable game apparatus, or a game controller. Sensor chip 110 is mounted on mounting board 100 such that two orthogonal detection axes are inclined at 45° from the vertical and from the horizontal with respect to each edge of mounting board 100.

Figure 14:
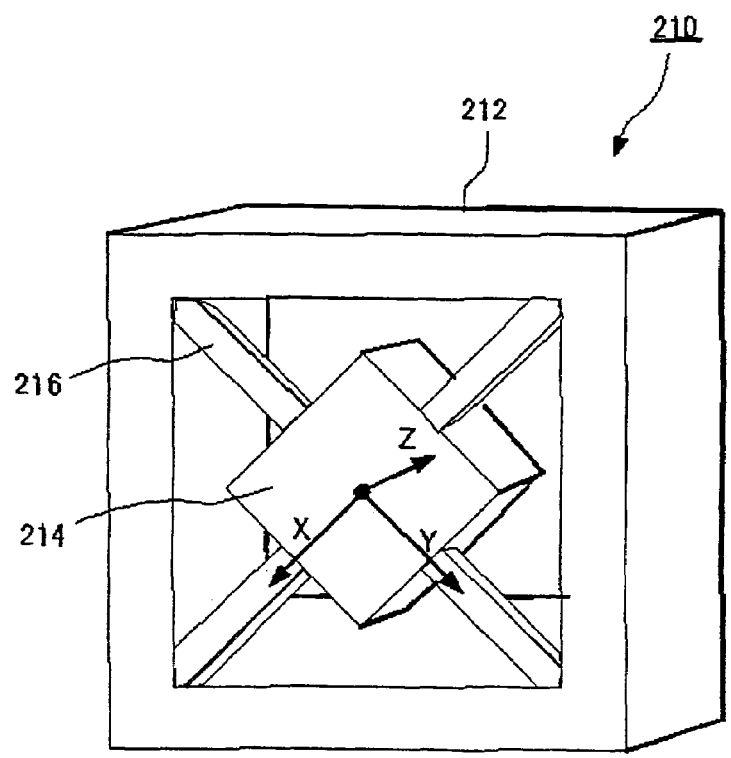
FIG. 14 is an explanatory view illustrating an actual state (orientation, arrangement) of using an acceleration sensor in accordance with a third embodiment of the present invention, showing a positional relation with a standard plane of an apparatus in which the acceleration sensor is installed.
Figure 14:
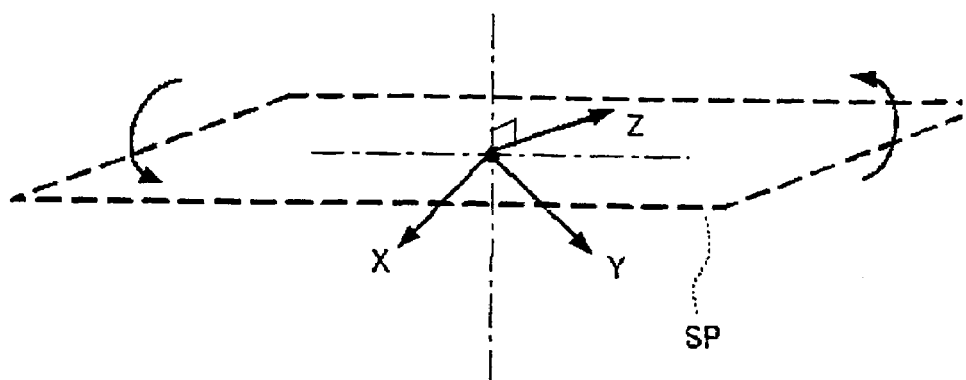

FIG. 14 is a schematic view illustrating a direction (an orientation) in which an acceleration sensor 210 in accordance with a third embodiment of the present invention is installed in an apparatus. In the drawing, SP indicates a standard plane when the apparatus equipped with sensor 210 is in a basic position, and numerals 212, 214, and 216 correspond to silicon substrate 12, movable structural portion 14, and beam 16 in the first embodiment, respectively. When the apparatus is in the basic position, a detection plane (214) of sensor 210 stands vertical. Specifically, the detection axis Z orthogonal to the detection axes X and Y in the detection plane (214) is disposed in parallel with standard plane SP of the apparatus in the basic position. Then, inclined displacement of standard surface SP is determined based on a difference between or a sum of an output signal on the detection axis X and an output signal on the detection axis Y, and the inclined displacement is corrected if necessary.

Mounting the acceleration sensor to form an angle of 45° with respect to standard plane SP of the apparatus may cause a problem such as occupying a large area on a printed board or a problem in terms of accuracy in a mounting angle. Such a problem can be solved by using a semiconductor piezoresistance acceleration sensor made of a silicon substrate with a (110) plane as shown in FIG. 14. In semiconductor piezoresistance, when the piezoresistance is formed in the direction of 45° with respect to a <001>axis or a <110>axis in the (110) plane in crystal plane orientation, a piezoresistance coefficient is increased compared to the case where the piezoresistance is formed on a <110>axis in a typical (100) plane in crystal plane orientation, allowing for highly sensitive detection. As shown in FIG. 14, since the piezoresistance formed of the (110) plane has a detection axis exactly in the direction of 45° with respect to an edge of the chip, there is no need to incline the chip itself at the time of mounting.

Although the embodiments (modes of operation) of the present invention have been described, the present invention is not limited to these embodiments, and can be modified within a category of technical idea described in the scope of the claims.

The invention claimed is:

1. An inclination sensor detecting inclined displacement of an electronic apparatus from a standard plane of a basic position, comprising:

a sensor chip having a detection plane detecting two-dimensional displacement including an X direction axis and a Y direction axis, wherein a Z axis orthogonal to said detection plane of said sensor chip is disposed in parallel with the standard plane of said electronic apparatus, said sensor chip includes a movable structural portion movable in two-dimensional directions in said detection plane, a substrate accommodating said movable structural portion, and a detecting portion outputting a signal according to displacement of said movable structural portion, the detecting portion of said sensor chip is disposed on the X detection axis extending to be inclined at about 45° from a direction parallel to said standard plane, and on the Y detection axis extending to be inclined at about 45° from a direction vertical to said standard plane, and the inclined displacement of said standard plane with respect to said basic position is determined based on a difference between or a sum of an output signal of said detecting portion on said X detection axis and an output signal of said detecting portion on said Y detection axis.

2. The inclination sensor according to claim 1, wherein the inclined displacement of said standard plane is determined by cancelling a noise component or a thermal characteristic component of said detecting portion on each detection axis, based on a difference between an output signal of said detecting portion on said X direction axis and an output signal of said detecting portion on said Y detection axis.

3. The inclination sensor according to claim 1, wherein said sensor chip is of semiconductor piezoresistance type formed of a silicon substrate with a (110) plane.

4. A rectangular mounting board on which the inclination sensor according to claim 1 is mounted, wherein the sensor chip for said inclination sensor is mounted such that a detection axis of the sensor is inclined from vertical and from horizontal with respect to each edge of said board.

5. The mounting board according to claim 4, wherein said sensor chip is of a semiconductor piezoresistance type formed of a silicon substrate with a (110) plane.

6. A method of detecting inclined displacement of an electronic apparatus with respect to a basic position using a sensor chip having a detection plane including X and Y detection axes orthogonal to each other, comprising the steps of:

disposing said sensor chip such that a Z axis orthogonal to said detection plane is in parallel with a standard plane corresponding to said basic position of said electronic apparatus, and at the same time said X detection axis is inclined at about 45° from said standard plane and said Y detection axis is inclined at about 45° from said standard plane, and determining the inclined displacement of said standard plane based on a difference between or a sum of an output signal corresponding to displacement in a direction of said X detection axis and an output signal corresponding to displacement in a direction of said Y detection axis.

7. The method according to claim 6, wherein the step of determining the inclined displacement of said standard plane is determined by cancelling a noise component or a thermal characteristic component of said detecting portion on each detection axis, based on a difference between an output signal of said detecting portion on said X detection axis and an output signal of said detecting portion on said Y detection axis.

* * * * *